(12) United States Patent
Itoh

(10) Patent No.: US 10,877,362 B2
(45) Date of Patent: Dec. 29, 2020

(54) WAVELENGTH CONVERSION ELEMENT, LIGHT SOURCE DEVICE, AND PROJECTOR

(71) Applicant: SEIKO EPSON CORPORATION, Tokyo (JP)

(72) Inventor: Yoshitaka Itoh, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 328 days.

(21) Appl. No.: 16/124,852

(22) Filed: Sep. 7, 2018

(65) Prior Publication Data
US 2019/0079376 A1    Mar. 14, 2019

(30) Foreign Application Priority Data
Sep. 8, 2017 (JP) .................. 2017-173266

(51) Int. Cl.
| | |
|---|---|
| G02B 26/08 | (2006.01) |
| G03B 21/20 | (2006.01) |
| G02B 26/00 | (2006.01) |
| G03B 21/16 | (2006.01) |

(52) U.S. Cl.
CPC ......... G03B 21/204 (2013.01); G02B 26/008 (2013.01); G03B 21/16 (2013.01); G03B 21/208 (2013.01); G03B 21/2066 (2013.01)

(58) Field of Classification Search
CPC .... G03B 21/204; G03B 21/208; G03B 21/16; G03B 21/2066; G02B 26/008; G02B 27/0961; G02B 27/1046; G02B 27/141; G02B 27/149; G02B 26/08
USPC ....................................... 359/204.4
See application file for complete search history.

(56) References Cited

U.S. PATENT DOCUMENTS

| | | | | |
|---|---|---|---|---|
| 2014/0021503 | A1* | 1/2014 | Yoshida | ............... H01L 33/641 257/98 |
| 2016/0238922 | A1 | 8/2016 | Furuyama et al. | |
| 2017/0219172 | A1 | 8/2017 | Inoue et al. | |

FOREIGN PATENT DOCUMENTS

| | | |
|---|---|---|
| JP | 2015-121586 A | 7/2015 |
| JP | 2015-215583 A | 12/2015 |
| JP | 2016-058213 A | 4/2016 |
| JP | 2016-061853 A | 4/2016 |

* cited by examiner

*Primary Examiner* — Euncha P Cherry
(74) *Attorney, Agent, or Firm* — Oliff PLC

(57) ABSTRACT

A wavelength conversion element includes: a wavelength conversion layer including a first surface on which excitation light is incident, and a second surface opposed to the first surface; a scattering layer provided to face the second surface, containing a plurality of particles, and at least scattering fluorescence obtained by wavelength-converting the excitation light by the wavelength conversion layer; and a reflective layer provided to face the scattering layer and reflecting the excitation light or the fluorescence. The particle diameter of the particle is smaller than the wavelength of the fluorescence.

15 Claims, 5 Drawing Sheets

WAVELENGTH CONVERSION ELEMENT, LIGHT SOURCE DEVICE, AND PROJECTOR

BACKGROUND

1. Technical Field

The present invention relates to a wavelength conversion element, a light source device, and a projector.

2. Related Art

In a projector, a light source device capable of obtaining high-intensity emission light is demanded in order to realize a higher luminance of a projection image. In recent years, therefore, alight source device including an excitation light source and a wavelength conversion element has been proposed. In this light source device, fluorescence is generated by irradiating the wavelength conversion element with excitation light emitted from the excitation light source such as a semiconductor laser or a light emitting diode, and this fluorescence is used as a portion of illumination light.

JP-A-2016-61853 discloses a wavelength conversion element including a substrate, an adhesive layer, a reflective layer, a scattering layer, and a phosphor layer. In JP-A-2016-61853, it is described, for example, that the scattering layer contains a scattering material made of titanium oxide, and that a holding material holding the scattering material is made of a silicone adhesive.

JP-A-2015-121586 discloses a projector phosphor wheel including a metal reflective substrate, a bonding material layer, a scattering layer, and a phosphor layer. In JP-A-2015-121586, it is described that when the average particle diameter of inorganic particles constituting the scattering layer is too small, it is difficult to obtain a sufficient scattering effect because of the wavelength dependence of Rayleigh scattering.

The wavelength conversion elements disclosed in JP-A-2016-61853 and JP-A-2015-121586 are used in a form in which a reflective surface is formed on a surface on the side opposite to the side on which excitation light is incident and fluorescence is emitted in the direction opposite to the direction in which the excitation light is incident. In the specification, this type of wavelength conversion element may be referred to as a reflective wavelength conversion element. For obtaining fluorescence with high light intensity in such a reflective wavelength conversion element, it is important not only to optimize the phosphor layer but also to increase the fluorescence reflected by the reflective surface or the like and emitted in the direction opposite to the direction in which the excitation light is incident. Hereinafter, this fluorescence is referred to as reflected fluorescence.

In the wavelength conversion elements disclosed in JP-A-2016-61853 and JP-A-2015-121586, the reflective surface using silver, aluminum, or the like is used. The reflective surface made of such metal is effective in terms of obtaining a high reflectance; however, the metal absorbs light, causing a light loss of, for example, approximately 3 to 5%. Moreover, when the intensity of incident light is extremely high, the metal deteriorates with heat generated by light absorption and thus the reflectance is lowered. Therefore, there is a limit to increasing the reflected fluorescence when the reflective surface made of silver or the like is simply used.

SUMMARY

An advantage of some aspects of the invention is to provide a wavelength conversion element capable of obtaining high-intensity fluorescence by increasing reflected fluorescence. Another advantage of some aspects of the invention is to provide a light source device including the wavelength conversion element. Still another advantage of some aspects of the invention is to provide a projector including the light source device.

A wavelength conversion element according to an aspect of the invention includes: a wavelength conversion layer including a first surface on which excitation light is incident, and a second surface opposed to the first surface; a scattering layer provided to face the second surface, containing a plurality of particles, and at least scattering fluorescence obtained by wavelength-converting the excitation light by the wavelength conversion layer; and a reflective layer provided to face the scattering layer and reflecting the excitation light or the fluorescence, wherein the particle diameter of the particle is smaller than the wavelength of the fluorescence.

In the wavelength conversion element according to the aspect of the invention, the particle diameter of the particle contained in the scattering layer is smaller than the wavelength of the fluorescence, and therefore, a mode when the fluorescence is scattered by the scattering layer can be made into one in which Rayleigh scattering dominates. In Rayleigh scattering, the backward scattering intensity of light is high compared to, for example, Mie scattering or the like, and therefore, it is possible to increase the ratio of reflected fluorescence going to the wavelength conversion layer without reaching the reflective layer where there is light loss. With this configuration, light loss at the reflective layer can be reduced to increase the intensity of the fluorescence, compared to the case where the particle diameter of the particle contained in the scattering layer is larger than the wavelength of the fluorescence.

The wavelength conversion element according to the aspect of the invention may further include: a substrate including a first surface; and a bonding layer. The reflective layer may be provided to face the first surface of the substrate, and the bonding layer may be provided between the scattering layer and the reflective layer.

According to this configuration, the reflective layer having high quality can be obtained by enhancing the flatness of the first surface of the substrate. Therefore, light loss at the reflective layer can be reduced to increase the intensity of the fluorescence.

The wavelength conversion element according to the aspect of the invention may further include: a substrate including a first surface; and a bonding layer. The reflective layer may be provided to face the scattering layer, and the bonding layer may be provided between the reflective layer and the first surface of the substrate.

According to this configuration, a stacked body including the wavelength conversion layer, the scattering layer, and the reflective layer is bonded with the substrate through the bonding layer. Therefore, there is no need to use a light-transmissive material for the bonding layer, and thus a material excellent in heat resistance, heat dissipation property, and the like can be selected as a bonding material from more materials.

The wavelength conversion element according to the aspect of the invention may further include a substrate including a first surface. The reflective layer may be provided to face the first surface of the substrate, the scattering layer may include a holding material holding the plurality of particles, and the wavelength conversion layer and the reflective layer may be bonded together by the holding material.

According to this configuration, the scattering layer also functions as a bonding layer. Therefore, there is no need to separately use a bonding layer, and the cost can be reduced.

In the wavelength conversion element according to the aspect of the invention, the particle may be made of titanium oxide or zinc oxide.

According to this configuration, it is possible to realize the scattering layer capable of obtaining high scattering intensity.

A light source device according to an aspect of the invention includes: the wavelength conversion element according to the aspect of the invention; and an excitation light source emitting the excitation light.

According to this configuration, light loss at the reflective layer can be reduced to increase the intensity of the fluorescence. Therefore, it is possible to realize the light source device with improved light intensity.

A projector according to an aspect of the invention includes: the light source device according to the aspect of the invention; a light modulator modulating light from the light source device according to image information to thereby form image light; and a projection optical device projecting the image light.

According to this configuration, the light source device with improved fluorescence intensity is used. Therefore, it is possible to realize the projector capable of obtaining a high-luminance projection image.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
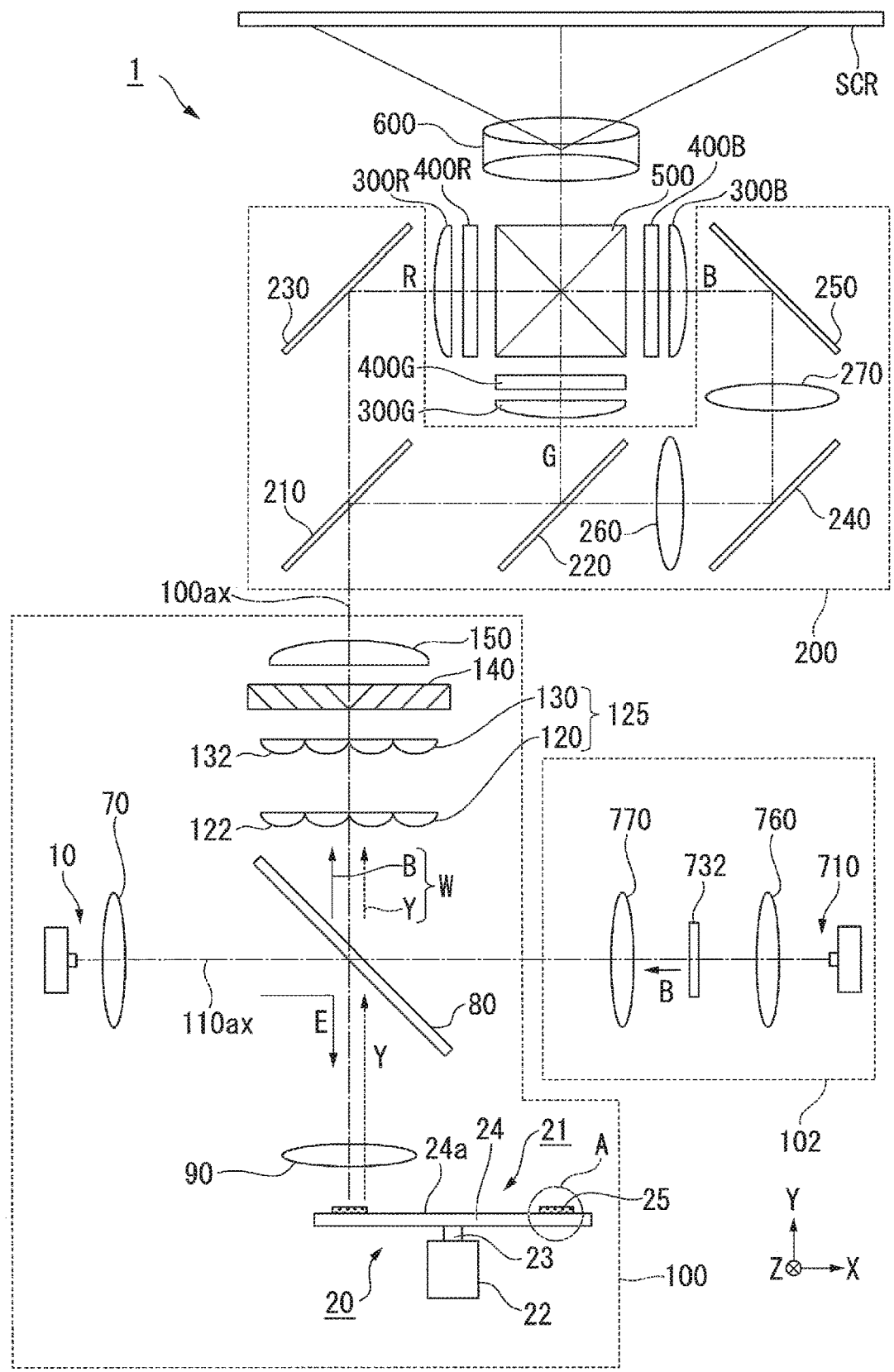
FIG. 1 is a schematic configuration diagram of a projector according to a first embodiment.

Hereinafter, a first embodiment of the invention will be described with reference to FIGS. 1 to 5.

A projector according to the embodiment is one example of a liquid crystal projector including a light source device including a semiconductor laser and a wavelength conversion element.

In the drawings below, components may be shown in different dimension scales for the sake of clarity of each of the components.

The projector according to the embodiment is a projection-type image display device that displays a color video on a screen (projected surface). Three light modulators corresponding to color lights: red light, green light, and blue light are used in the projector. A semiconductor laser (laser diode) capable of obtaining high-luminance, high-output light is used as a light emitting element of a light source device in the projector.

FIG. 1 is a schematic configuration diagram of the projector according to the embodiment.

As shown in FIG. 1, the projector 1 includes a first light source device 100 (light source device), a second light source device 102, a color separation light guiding optical system 200, a light modulator 400R, a light modulator 400G, a light modulator 400B, a combining optical system 500, and a projection optical device 600.

The first light source device 100 according to the embodiment corresponds to a light source device in the appended claims.

The first light source device 100 includes a first light emitting element 10, a collimating optical system 70, a dichroic mirror 80, a collimating and condensing optical system 90, a wavelength conversion device 20, a homogenizer optical system 125, a polarization conversion element 140, and a superimposing lens 150. The wavelength conversion device 20 will be described in detail later.

The first light emitting element 10 includes a semiconductor laser that emits blue excitation light E. The emission-intensity peak wavelength of the excitation light E is, for example, 445 nm. The first light emitting element 10 may include one semiconductor laser, or may include a plurality of semiconductor lasers. For the first light emitting element 10, a semiconductor laser that emits blue light at a wavelength (e.g., 460 nm) other than 445 nm may be used. The first light emitting element 10 is disposed such that an optical axis 110ax of the first light emitting element 10 is orthogonal to an illumination optical axis 100ax.

The first light emitting element 10 according to the embodiment corresponds to an excitation light source in the appended claims.

The collimating optical system 70 includes a convex lens. The collimating optical system 70 substantially parallelizes the light emitted from the first light emitting element 10.

The dichroic mirror 80 is provided in an optical path from the collimating optical system 70 to the collimating and condensing optical system 90. The dichroic mirror 80 is disposed so as to cross each of the optical axis 110ax of the first light emitting element 10 and the illumination optical axis 100ax at an angle of 45°. The dichroic mirror 80 reflects light in a blue wavelength range while transmitting light in a yellow wavelength range including red light and green light.

The collimating and condensing optical system 90 has the function of causing the excitation light E emitted from the dichroic mirror 80 to be incident in a substantially condensed state on a wavelength conversion element 21, and the function of substantially parallelizing fluorescence Y emitted from the wavelength conversion element 21. The collimating and condensing optical system 90 includes a convex lens.

The second light source device 102 includes a second light emitting element 710, a condensing optical system 760, a diffuser 732, and a collimating optical system 770.

The second light emitting element 710 includes a semiconductor laser that emits blue light B. The emission-intensity peak wavelength of the blue light B is different from the emission-intensity peak wavelength of the excitation light E from the first light emitting element 10, and is, for example, 460 nm. However, a semiconductor laser that emits light having the same peak wavelength as the emission-intensity peak wavelength of the excitation light E from the first light emitting element 10 may be used as the second light emitting element 710.

The condensing optical system 760 includes a convex lens. The condensing optical system 760 condenses the blue light B emitted from the second light emitting element 710 near the diffuser 732.

The diffuser 732 diffuses the blue light B emitted from the second light emitting element 710 to make the blue light B into blue light B having a light distribution similar to a light distribution of the fluorescence Y emitted from the wavelength conversion device 20. As the diffuser 732, for example, frosted glass made of optical glass can be used.

The collimating optical system 770 includes a convex lens. The collimating optical system 770 substantially parallelizes the light emitted from the diffuser 732.

The blue light B emitted from the second light source device 102 is reflected by the dichroic mirror 80 and then combined with the fluorescence Y transmitted through the dichroic mirror 80 to constitute white illumination light W. The illumination light W is incident on the homogenizer optical system 125.

The homogenizer optical system 125 includes a first lens array 120 and a second lens array 130. The first lens array 120 includes a plurality of first lenses 122 for dividing the light emitted from the dichroic mirror 80 into a plurality of partial luminous fluxes. The plurality of first lenses 122 are arranged in a matrix in a plane orthogonal to the illumination optical axis 100ax.

The second lens array 130 includes a plurality of second lenses 132 corresponding to the plurality of first lenses 122 of the first lens array 120. The second lens array 130 superimposes, together with the superimposing lens 150, images of the first lenses 122 of the first lens array 120 near the image forming regions of the light modulator 400R, the light modulator 400G, and the light modulator 400B. The plurality of second lenses 132 are arranged in a matrix in a plane orthogonal to the illumination optical axis 100ax.

The polarization conversion element 140 converts the partial luminous fluxes divided by the first lens array 120 into linearly polarized light. Although a detailed illustration of the polarization conversion element 140 is omitted, the polarization conversion element 140 includes a polarization separation layer, a reflective layer, and a retardation layer. The polarization separation layer transmits one linear polarization component of polarization components, which are included in the light from the wavelength conversion device 20, as it is while reflecting the other linear polarization component in the direction perpendicular to the illumination optical axis 100ax. The reflective layer reflects the other linear polarization component reflected by the polarization separation layer in the direction parallel to the illumination optical axis 100ax. The retardation layer converts the other linear polarization component reflected by the reflective layer into the one linear polarization component.

The superimposing lens 150 condenses the partial luminous fluxes from the polarization conversion element 140 and superimposes the partial luminous fluxes on each other near the image forming regions of the light modulator 400R, the light modulator 400G, and the light modulator 400B. The first lens array 120, the second lens array 130, and the superimposing lens 150 homogenize an in-plane light intensity distribution of the white illumination light W.

The color separation light guiding optical system 200 separates the white illumination light W into red light R, green light G, and blue light B. The color separation light guiding optical system 200 includes a first dichroic mirror 210, a second dichroic mirror 220, a first reflection mirror 230, a second reflection mirror 240, a third reflection mirror 250, a first relay lens 260, and a second relay lens 270.

The first dichroic mirror 210 has the function of separating the illumination light W emitted from the first light source device 100 into the red light R and the other light (the green light G and the blue light B). The first dichroic mirror 210 transmits the red light R while reflecting the other light (the green light G and the blue light B). On the other hand, the second dichroic mirror 220 has the function of separating the other light into the green light G and the blue light B. The second dichroic mirror 220 reflects the green light G and transmits the blue light B.

The first reflection mirror 230 is disposed in the optical path of the red light R, and reflects the red light R transmitted through the first dichroic mirror 210 toward the light modulator 400R. The second reflection mirror 240 and the third reflection mirror 250 are disposed in the optical path of the blue light B, and reflect the blue light B transmitted through the second dichroic mirror 220 toward the light modulator 400B. The green light G is reflected toward the light modulator 400G by the second dichroic mirror 220.

The first relay lens 260 and the second relay lens 270 are disposed on the light exiting side of the second dichroic mirror 220 in the optical path of the blue light B. The first relay lens 260 and the second relay lens 270 compensate for the loss of the blue light B due to the fact that the optical path length of the blue light B is longer than the optical path length of the red light R or the green light G.

The light modulator 400R modulates the red light R according to image information to form image light corresponding to the red light R. The light modulator 400G modulates the green light G according to image information to form image light corresponding to the green light G. The light modulator 400B modulates the blue light B according to image information to form image light corresponding to the blue light B.

For example, transmissive liquid crystal panels are used for the light modulator 400R, the light modulator 400G, and the light modulator 400B. A pair of polarizers (not shown) are disposed on the incident and exiting sides of the liquid crystal panel and thus configured to transmit only linearly polarized light in a specific direction.

A field lens 300R, a field lens 300G, and a field lens 300B are respectively disposed on the incident sides of the light modulator 400R, the light modulator 400G, and the light modulator 400B. The field lens 300R, the field lens 300G, and the field lens 300B parallelize the red light R, the green light G, and the blue light B to be respectively incident on the light modulator 400R, the light modulator 400G, and the light modulator 400B.

The combining optical system 500 combines the image lights corresponding to the red light R, the green light G, and the blue light B from the light modulator 400R, the light modulator 400G, and the light modulator 400B to form one image light, and emits the image light toward the projection optical device 600. For example, a cross dichroic prism is used for the combining optical system 500.

The projection optical device 600 includes a projection lens group. The projection optical device 600 enlarges and projects the image light combined by the combining optical system 500 toward a screen SCR. With this configuration, an enlarged color video (image) is displayed on the screen SCR.

Hereinafter, the configuration of the wavelength conversion device 20 will be described.

Figure 2:
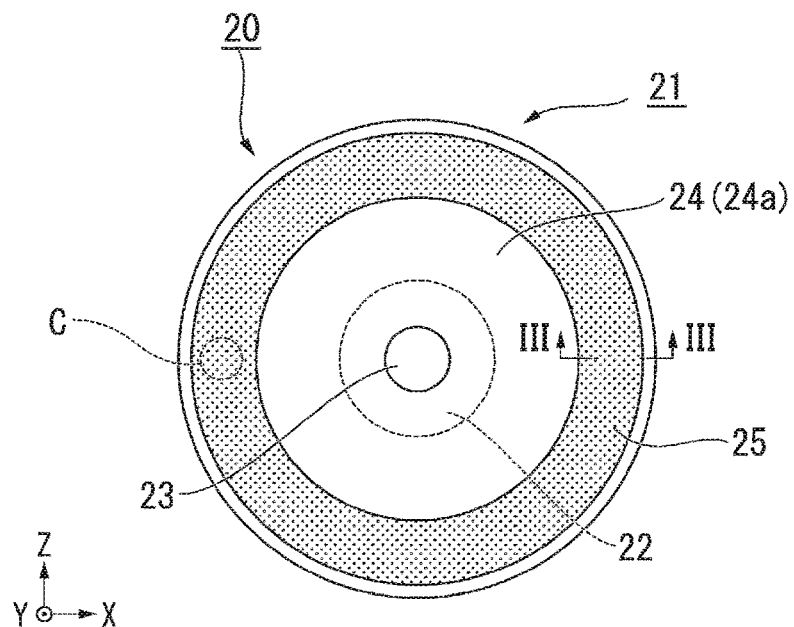
FIG. 2 is a plan view of a wavelength conversion device.

FIG. 2 is a plan view of the wavelength conversion device 20 as viewed in the Y-direction in FIG. 1.

As shown in FIGS. 1 and 2, the wavelength conversion device 20 includes the wavelength conversion element 21 and a motor 22 rotating the wavelength conversion element 21.

The wavelength conversion element 21 rotates about a rotation axis 23 by being driven by the motor 22. The substrate 24 has a circular shape as viewed in the extending direction of the rotation axis 23. A phosphor layer 25 is provided in an annular shape along the circumferential direction of the substrate 24 on a first surface 24a of the substrate 24. One place of the phosphor layer 25 having an annular shape is irradiated with the excitation light E. In FIG. 2, the region irradiated with the excitation light E is denoted by reference sign C.

Figure 3:
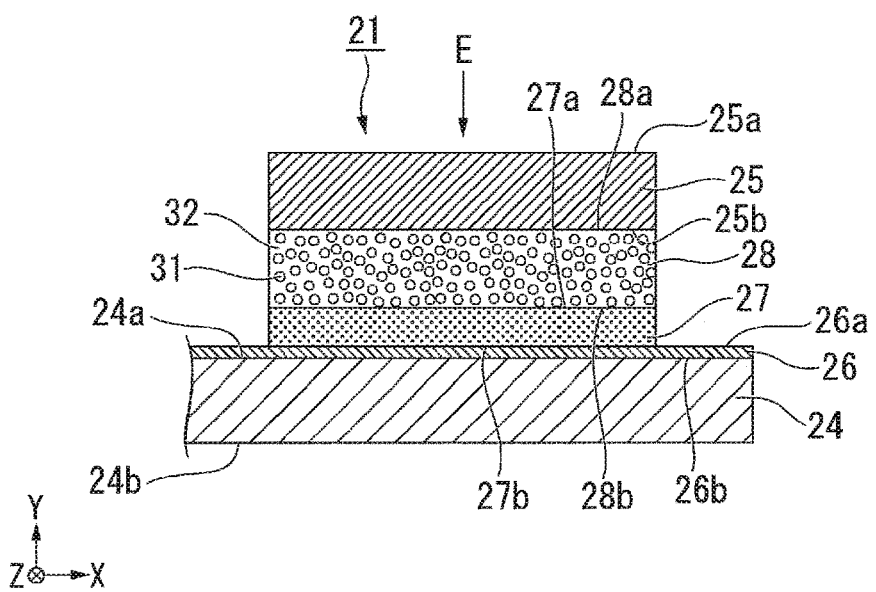
FIG. 3 is a cross-sectional view of a wavelength conversion element along line III-III in FIG. 2.

FIG. 3 is a cross-sectional view of the wavelength conversion element 21 along line III-III in FIG. 2.

As shown in FIG. 3, the wavelength conversion element 21 includes the substrate 24, a reflective layer 26, a bonding layer 27, a scattering layer 28, and the phosphor layer 25 (wavelength conversion layer). The phosphor layer 25, the scattering layer 28, the bonding layer 27, and the reflective layer 26 are provided, in order from the side on which the excitation light E is incident, on the first surface 24a (upper surface) of the substrate 24.

The phosphor layer 25 includes a first surface 25a (upper surface) on which the excitation light E is incident and from which the fluorescence Y is emitted, and a second surface 25b (lower surface) opposed to the first surface 25a (located on the side of the scattering layer 28, to be described later, on the side opposite to the first surface 25a). That is, the wavelength conversion element 21 is a reflective wavelength conversion element that causes the fluorescence Y to be emitted from the same surface (the first surface 25a) as the surface on which the excitation light E is incident.

The first surface 25a is also referred to as the first surface 25a of the phosphor layer. The second surface 25b is also referred to as the second surface 25b of the phosphor layer.

The phosphor layer 25 includes a phosphor that emits the fluorescence Y of yellow in a wavelength range of 450 to 650 nm by being excited by the excitation light E emitted from the first light emitting element 10. The phosphor layer 25 includes a YAG-based phosphor made of $(Y,Gd)_3(Al,Ga)_5O_{12}$(YAG) as an inorganic material, and an activator (Ce) dispersed in the YAG-based phosphor and serving as a luminescent center. That is, the phosphor layer 25 includes a YAG-based phosphor made of $(Y,Gd)_3(Al,Ga)_5O_{12}$(YAG: Ce) in which Ce is dispersed as an activator.

Although the phosphor layer 25 may not necessarily include a YAG-based phosphor, it is desirable to use a garnet-based phosphor. A garnet-based phosphor has high thermal conductivity compared to other phosphors, and thus has high reliability under a high-temperature environment. Therefore, even when a garnet-based phosphor is used for a light source device using a phosphor not being of a rotating wheel type but being of a fixed type, high-output fluorescence can be obtained.

The scattering layer 28 includes a plurality of particles 31 and a holding material 32 holding the plurality of particles 31. The plurality of particles 31 are present in a dispersed state inside the holding material 32. The scattering layer 28 is provided to face the second surface 25b of the phosphor layer 25, and at least reflects a portion of the fluorescence Y obtained by wavelength-converting the excitation light E by the phosphor layer 25. The scattering layer 28 includes a first surface 28a (upper surface) facing the second surface 25b, and a second surface 28b (lower surface) opposed to the first surface 28a (located on the side of the bonding layer 27, to be described later, on the side opposite to the first surface 28a). The first surface 28a is also referred to as the first surface 28a of the scattering layer. The second surface 28b is also referred to as the second surface 28b of the scattering layer.

The conditions required for the particle 31 are, for example, that the particle 31 has a predetermined particle diameter, that the particle 31 has a high refractive index, and that the particle 31 does not have a light absorptive property with respect to the wavelength range of the fluorescence Y generated in the phosphor layer 25. As the particle 31 satisfying these kinds of conditions, a particle made of titanium oxide can be suitably used. As another example, a particle made of zinc oxide can also be used.

The particle diameter of the particle 31 is smaller than the wavelength of the fluorescence Y generated in the phosphor layer 25. As one example, it is desirable that the particle diameter of the particle 31 is approximately one-half or less of the wavelength of the fluorescence Y. The plurality of particles 31 have a particle diameter distribution in many cases, and therefore, the particle diameter of the particle 31 in the specification means the average particle diameter.

A material having a refractive index lower than the refractive index of the particle 31 and having a high light-transmissive property is used for the holding material 32. Specifically, for example, an inorganic material such as glass or an organic material such as resin is used.

The substrate 24 includes a metal plate such as of copper or aluminum, which has relatively high thermal conductivity. The substrate 24 has the functions of supporting the reflective layer 26 to be described later, the bonding layer 27 to be described later, the scattering layer 28, and the phosphor layer 25, and dissipating the heat generated in the phosphor layer 25. For enhancing the heat dissipation function, a heat dissipating member such as a heat sink may be provided on a second surface 24b (lower surface) of the substrate 24. The second surface 24b of the substrate 24 is opposed to the first surface 24a of the substrate 24.

The reflective layer 26 includes a dielectric multilayer film, a metal thin film such as of silver or aluminum, or a stacked film obtained by combining these films. The reflective layer 26 is provided on the first surface 24a of the substrate 24. In the fluorescence Y emitted from the phosphor layer 25, the reflective layer 26 reflects the fluorescence Y that travels toward the substrate 24 side and causes the fluorescence Y to travel again toward the phosphor layer 25. Moreover, the reflective layer 26 reflects the excitation light E that is emitted from the phosphor layer 25 without contributing to light emission and causes the excitation light E to travel again toward the phosphor layer 25. That is, the reflective layer 26 is provided to face the scattering layer 28, and reflects the excitation light E or the fluorescence Y. The reflective layer 26 includes a second surface 26b (lower surface) facing the first surface 24a of the substrate 24, and a first surface 26a (upper surface) facing the bonding layer 27 to be described later. The first surface 26a is also referred to as the first surface 26a of the reflective layer. The second surface 26b is also referred to as the second surface 26b of the reflective layer.

The bonding layer 27 is made of an adhesive having a low refractive index and a high light-transmissive property. As one example, the bonding layer 27 is made of a silicone-based or acrylic-based organic adhesive, an inorganic adhesive such as a low-melting-point glass, or the like. The bonding layer 27 bonds the substrate 24 on which the reflective layer 26 is provided with a separately manufactured stacked body formed of the scattering layer 28 and the phosphor layer 25. That is, the bonding layer 27 is provided between the scattering layer 28 and the reflective layer 26, and bonds the scattering layer 28 and the reflective layer 26 together. The bonding layer 27 includes a first surface 27a (upper surface) facing the second surface 28b, and a second surface 27b facing the first surface 26a. The first surface 27a and the second surface 27b are opposed to each other. The first surface 27a is also referred to as the first surface 27a of the bonding layer. The second surface 27b is also referred to as the second surface 27b of the bonding layer.

In manufacturing the wavelength conversion element 21 configured as described above, the reflective layer 26 formed of a dielectric multilayer film or a metal thin film such as of silver or aluminum is formed on the first surface 24a of the substrate 24 made of copper or the like. It is desirable in forming the reflective layer 26 that the first surface 24a of the substrate 24 is previously made into a smooth surface state by a method such as polishing. With this configuration, the reflective layer 26 having high quality with a high reflectance can be formed.

On the other hand, the scattering layer 28 including the particles 31 such as of titanium oxide and the holding material 32 is formed on the second surface 25b of the phosphor layer 25. On this occasion, a dispersion liquid obtained by dispersing, for example, titanium oxide particles into resin such as, for example, alkyd resin is prepared, and this dispersion liquid is applied to the second surface 25b of the phosphor layer 25.

Thereafter, the phosphor layer 25 to which the dispersion liquid is applied is dried and heated under conditions of, for example, a temperature of 150° C. for a time of 30 minutes to thereby form the scattering layer 28 on the second surface 25b of the phosphor layer 25, so that the stacked body formed of the phosphor layer 25 and the scattering layer 28 is manufactured.

Thereafter, the substrate 24 on which the reflective layer 26 is formed and the stacked body are bonded together using an adhesive such as a silicone-based adhesive, which is used as the bonding layer 27.

Through the steps described above, the wavelength conversion element 21 is completed.

Hereinafter, the operational effect of the wavelength conversion element 21 according to the embodiment will be described.

The fluorescence Y generated by irradiation of the excitation light E in the phosphor layer 25 does not have directivity, and thus isotropically spreads and travels in a wide angular range. The fluorescence Y incident on the scattering layer 28 from the phosphor layer 25 is scattered by the scattering layer 28 including the plurality of particles 31 having a refractive index different from the refractive index of the holding material 32.

Here, in elastic scattering where energy is conserved (there is no light loss), it is known that scattering phenomena in different modes are exhibited depending on the size (particle diameter) of a scatterer. When the particle diameter is sufficiently larger than the wavelength of light, geometrical optics approximate scattering occurs; when the particle diameter is approximately the same as the wavelength of light, Mie scattering occurs; and when the particle diameter is sufficiently smaller than the wavelength of light, Rayleigh scattering occurs.

That is, a particle diameter parameter α, which is a parameter relating to a wavelength λ of light and a particle diameter d, is expressed as Equation (1) below, where a circular constant π is a coefficient.

$$\alpha = \pi \cdot d / \lambda \quad (1)$$

As criteria for knowing the mode of scattering, it can be considered that geometrical approximate scattering occurs when $\alpha \gg 1$, that Mie scattering occurs when $\alpha \approx 1$, and that Rayleigh scattering occurs when $\alpha \ll 1$.

Figure 4:
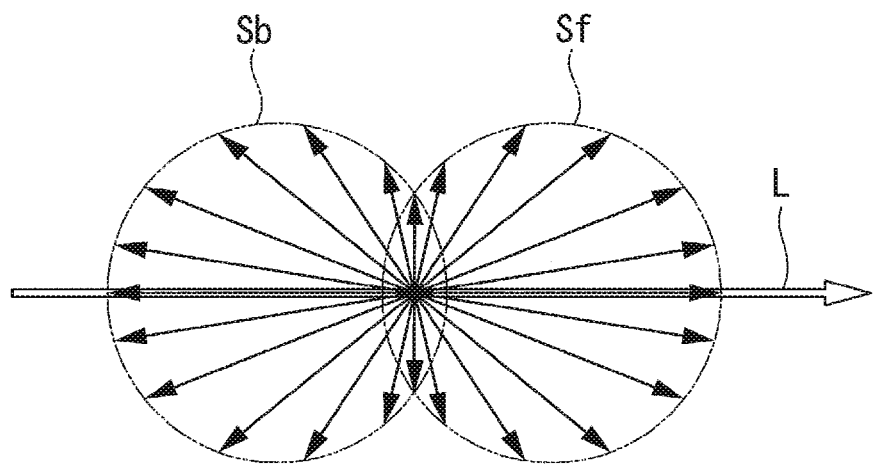
FIG. 4 is a schematic view showing an intensity distribution of scattered light in Rayleigh scattering.

Forward scattering dominates backward scattering in Mie scattering; on the other hand, in Rayleigh scattering, the intensity of backward-scattered light Sb when light L is incident is approximately the same as the intensity of forward-scattered light Sf as shown in FIG. 4. Moreover, Rayleigh scattering has characteristics, for example, such that the scattering direction does not depend on the particle diameter, and that the scattering intensity has wavelength dependence and thus the scattering intensity is higher as the wavelength is shorter. In the related art, most of scatterers generally used for a phosphor have a particle diameter of approximately 1 to tens of micrometers, and Mie scattering occurs when the particle diameter falls within this range.

Figure 5:
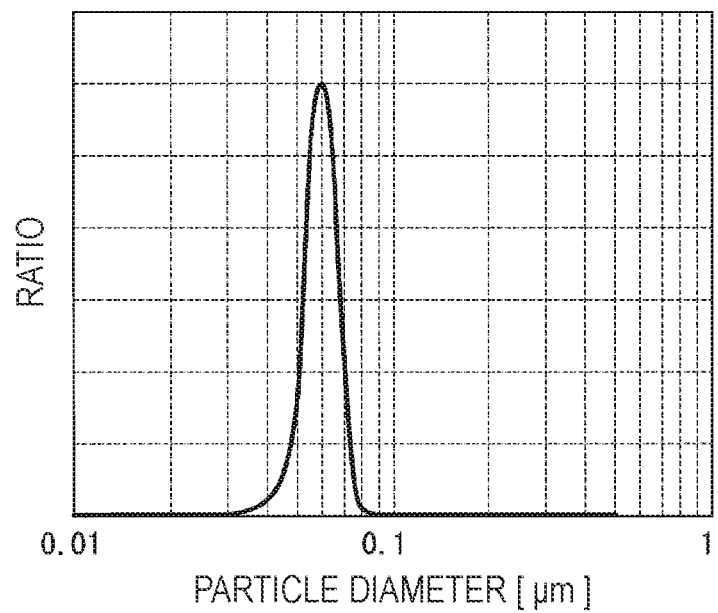
FIG. 5 shows one example of a particle diameter distribution of titanium oxide particles.

FIG. 5 is a graph showing one example of a particle diameter distribution of titanium oxide particles used in the embodiment. The horizontal axis in FIG. 5 represents the particle diameter (μm) while the vertical axis represents the ratio (relative value) of particles at each particle diameter.

As shown in FIG. 5, the titanium oxide particles in the embodiment have a particle diameter distribution from, for example, approximately 0.04 to 0.08 μm, and the average particle diameter is approximately 0.06 μm.

In the case of the embodiment, the wavelength range of the fluorescence Y scattered by the scattering layer 28 is from 450 to 650 nm (0.45 to 0.65 μm). Therefore, when the particle diameter d=0.06 (μm) and the wavelength λ=0.45 (μm), $\alpha \approx 0.4$ is established from Equation (1).

From the above, Rayleigh scattering occurs when the fluorescence Y is incident on the scattering layer 28.

In a wavelength conversion element including a scattering layer in the related art, Mie scattering occurs when the fluorescence Y is incident on the scattering layer. Therefore, there is a problem in that the occupying ratio of forward-scattered light in the whole scattered light is high and thus much fluorescence is lost at the reflective layer. In contrast, in the wavelength conversion element 21 according to the embodiment, Rayleigh scattering occurs when the fluorescence Y is incident on the scattering layer 28. Therefore, the occupying ratio of the fluorescence Y that returns from the scattering layer 28 to the phosphor layer 25 without reaching the reflective layer 26 due to backward scattering, in the whole fluorescence Y, is high compared to that in the related art.

Also in the embodiment, a portion of the fluorescence Y that is forward-scattered when Rayleigh scattering occurs is reflected by the reflective layer 26, changes its traveling direction, and returns to the phosphor layer 25. At this time, the loss of the fluorescence Y occurs at the reflective layer 26. Further, a portion of the fluorescence Y that is reflected by the reflective layer 26 and then incident on the scattering layer 28 travels again to the reflective layer 26 due to backward scattering. This fluorescence Y is reflected by the reflective layer 26 while causing light loss and is incident on the scattering layer 28. Thereafter, again, a portion of the fluorescence Y returns to the phosphor layer 25, and another portion travels to the reflective layer 26 due to backward scattering. As described above, a portion of the fluorescence Y reflected by the reflective layer 26 repeats reflection multiple times (multiple reflection) between the scattering layer 28 and the reflective layer 26, which causes light loss according to the number of times of reflection.

However, such fluorescence Y is less compared to fluorescence that returns to the phosphor layer 25 due to backward scattering when first incident on the scattering layer 28. Hence, as a whole, the amount of the fluorescence Y that is emitted toward the side on which the excitation light E is incident can be increased in the phosphor layer 25 by use of the scattering layer 28 exhibiting backward scattering.

As has been described above, according to the wavelength conversion element 21 according to the embodiment, a portion of the fluorescence Y that travels from the phosphor layer 25 to the reflective layer 26 is backward-scattered by the scattering layer 28 and thus can be returned to the phosphor layer 25 without through the reflective layer 26 where there is light loss. It is impossible to return all of the fluorescence Y incident on the scattering layer 28 from the phosphor layer 25 to the phosphor layer 25 by backward scattering. However, the ratio of fluorescence that returns to the phosphor layer 25 through the reflective layer 26 is reduced, and therefore, the amount of the fluorescence Y that is emitted from the wavelength conversion element 21 can be increased. With this configuration, it is possible to realize the wavelength conversion element 21 capable of obtaining the fluorescence Y with high intensity.

Moreover, in the case of the embodiment, the reflective layer 26 is provided on the first surface 24a of the substrate 24, and therefore, it is easy to form the reflective layer 26 having high quality. Moreover, the particles 31 of the scattering layer 28 are made of titanium oxide or zinc oxide, and therefore, it is possible to realize the scattering layer 28 capable of obtaining a high scattering intensity.

In the embodiment, the wavelength conversion element 21 and the first light emitting element 10 are used, and therefore, it is possible to realize the first light source device 100 with improved light intensity. Moreover, the first light source device 100 capable of obtaining fluorescence with improved light intensity is used, and therefore, it is possible to realize the projector 1 capable of obtaining a high-luminance projection image.

In the embodiment, the second surface 25b of the phosphor layer 25 may abut or face the first surface 28a of the scattering layer 28. When the second surface 25b of the phosphor layer 25 faces the first surface 28a of the scattering layer 28, a different layer may be provided between the second surface 25b of the phosphor layer 25 and the first surface 28a of the scattering layer 28.

Similarly, the second surface 28b of the scattering layer 28 may abut or face the first surface 27a of the bonding layer 27. When the second surface 28b of the scattering layer 28 faces the first surface 27a of the bonding layer 27, a different layer may be provided between the second surface 28b of the scattering layer 28 and the first surface 27a of the bonding layer 27.

Similarly, the second surface 27b of the bonding layer 27 may abut or face the first surface 26a of the reflective layer 26. When the second surface 27b of the bonding layer 27 faces the first surface 26a of the reflective layer 26, a different layer may be provided between the second surface 27b of the bonding layer 27 and the first surface 26a of the reflective layer 26.

Similarly, the second surface 26b of the reflective layer 26 may abut or face the first surface 24a of the substrate 24. When the second surface 26b of the reflective layer 26 faces the first surface 24a of the substrate 24, a different layer may be provided between the second surface 26b of the reflective layer 26 and the first surface 24a of the substrate 24.

Second Embodiment

Hereinafter, a second embodiment of the invention will be described with reference to FIG. 6.

Basic configurations of a projector and a light source device according to the second embodiment are similar to those of the first embodiment, and the configuration of a wavelength conversion element is different from that of the first embodiment. Therefore, an overall description of the projector and the light source device is omitted, and only the wavelength conversion element will be described.

Figure 6:
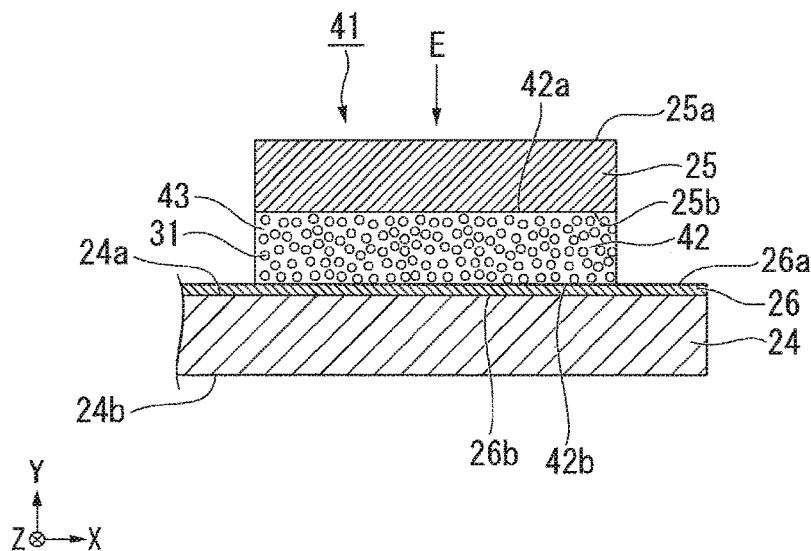
FIG. 6 is a cross-sectional view of a wavelength conversion element according to a second embodiment.

FIG. 6 is a cross-sectional view of the wavelength conversion element 41 according to the second embodiment.

In FIG. 6, components common to those in the drawings used in the first embodiment are denoted by the same reference numerals and signs, and a detailed description of the components is omitted.

As shown in FIG. 6, the wavelength conversion element 41 includes the substrate 24, the reflective layer 26, a scattering layer 42, and the phosphor layer 25 (wavelength conversion layer). The phosphor layer 25, the scattering layer 42, and the reflective layer 26 are provided, in order from the side on which the excitation light E is incident, on the first surface 24a (upper surface) of the substrate 24.

Similarly to the first embodiment, the reflective layer 26 is provided on the first surface 24a of the substrate 24. The scattering layer 42 includes the plurality of particles 31 and a holding material 43 holding the plurality of particles 31. In the case of the embodiment, a resin material is used as the holding material 43. Due to the adhesive property of the resin material, the phosphor layer 25 and the reflective layer 26 are bonded together by the holding material 43. That is, the holding material 43 constituting the scattering layer 42 functions as an adhesive in the embodiment, and therefore, the bonding layer used in the first embodiment is unnecessary.

Other configurations of the wavelength conversion element 41 are similar to those of the first embodiment.

The scattering layer 42 includes a first surface 42a (upper surface) facing the second surface 25b, and a second surface 42b facing the first surface 26a. The first surface 42a and the second surface 42b are opposed to each other. The first surface 42a is also referred to as the first surface 42a of the scattering layer 42. The second surface 42b is also referred to as the second surface 42b of the scattering layer 42.

Also in the embodiment, it is possible to obtain an advantageous effect that it is possible to realize the wavelength conversion element 41 capable of reducing light loss at the reflective layer to increase the intensity of fluorescence, similarly to the first embodiment.

Moreover, in the embodiment, the configuration of the wavelength conversion element 41 is simplified, and therefore, the cost of the wavelength conversion element 41 is reduced. Moreover, a bonding layer is not present between the phosphor layer 25 and the substrate 24; therefore, thermal conductivity between the phosphor layer 25 and the substrate 24 is improved, and thus the heat generated in the phosphor layer 25 can be quickly transferred to the substrate 24 and dissipated. With this configuration, thermal quenching occurring due to a heated phosphor can be reduced, and an improvement in the luminous efficiency of the phosphor layer 25 can be expected.

In the embodiment, the second surface 25b of the phosphor layer 25 may abut or face the first surface 42a of the scattering layer 42. When the second surface 25b of the phosphor layer 25 faces the first surface 42a of the scattering layer 42, a different layer may be provided between the second surface 25b of the phosphor layer 25 and the first surface 42a of the scattering layer 42.

Similarly, the second surface 42b of the scattering layer 42 may abut or face the first surface 26a of the reflective layer 26. When the second surface 42b of the scattering layer 42 faces the first surface 26a of the reflective layer 26, a different layer may be provided between the second surface 42b of the scattering layer 42 and the first surface 26a of the reflective layer 26.

Third Embodiment

Hereinafter, a third embodiment of the invention will be described with reference to FIG. 7.

Basic configurations of a projector and a light source device according to the third embodiment are similar to those of the first embodiment, and the configuration of a wavelength conversion element is different from that of the first embodiment. Therefore, an overall description of the projector and the light source device is omitted, and only the wavelength conversion element will be described.

Figure 7:
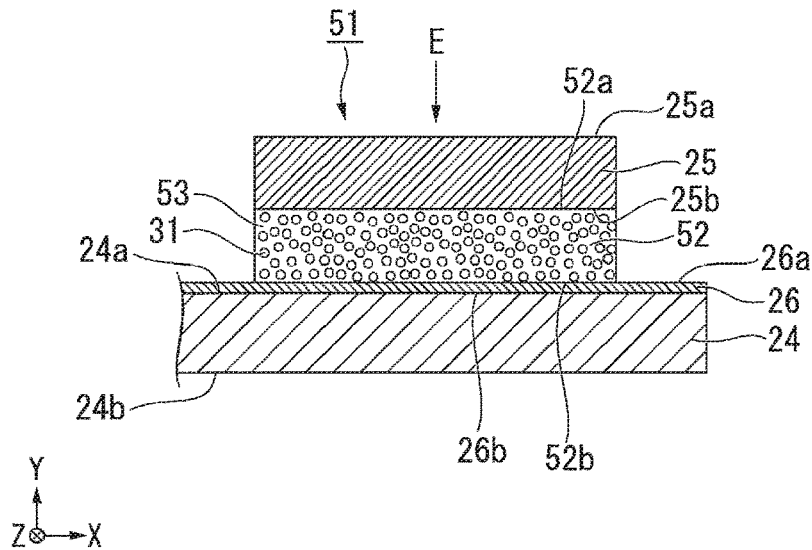
FIG. 7 is a cross-sectional view of a wavelength conversion element according to a third embodiment.

FIG. 7 is a cross-sectional view of the wavelength conversion element 51 according to the third embodiment.

In FIG. 7, components common to those in the drawings used in the first embodiment are denoted by the same reference numerals and signs, and a detailed description of the components is omitted.

As shown in FIG. 7, the wavelength conversion element 51 includes the substrate 24, the reflective layer 26, a scattering layer 52, and the phosphor layer 25 (wavelength conversion layer). The phosphor layer 25, the scattering layer 52, and the reflective layer 26 are provided, in order from the side on which the excitation light E is incident, on the first surface 24a (upper surface) of the substrate 24.

Similarly to the first embodiment, the reflective layer 26 is provided on the first surface 24a of the substrate 24. The scattering layer 52 includes the plurality of particles 31 and a holding material 53 holding the plurality of particles 31. In the case of the embodiment, an adhesive made of a resin material is used as the holding material 53. With this configuration, the phosphor layer 25 and the reflective layer 26 are bonded together by the holding material 53. That is, in the embodiment, the scattering layer 52 is formed by dispersing the plurality of particles 31 into the resin adhesive and curing the resin adhesive.

Other configurations of the wavelength conversion element 51 are similar to those of the first embodiment.

The scattering layer 52 includes a first surface 52a (upper surface) facing the second surface 25b, and a second surface 52b facing the first surface 26a. The first surface 52a and the second surface 52b are opposed to each other. The first surface 52a is also referred to as the first surface 52a of the scattering layer 52. The second surface 52b is also referred to as the second surface 52b of the scattering layer 52.

Also in the embodiment, it is possible to obtain an advantageous effect that it is possible to realize the wavelength conversion element 51 capable of reducing light loss at the reflective layer to increase the intensity of fluorescence, similarly to the first embodiment.

Moreover, also in the embodiment, it is possible to obtain advantageous effects that the cost of the wavelength conversion element 51 can be reduced, and that an improvement in heat dissipation property due to improved thermal conductivity and an improvement in the luminous efficiency of the phosphor layer 25 due to reduced thermal quenching can be expected, similarly to the second embodiment.

In the embodiment, the second surface 25b of the phosphor layer 25 may abut or face the first surface 52a of the scattering layer 52. When the second surface 25b of the phosphor layer 25 faces the first surface 52a of the scattering layer 52, a different layer may be provided between the second surface 25b of the phosphor layer 25 and the first surface 52a of the scattering layer 52.

Similarly, the second surface 52b of the scattering layer 52 may abut or face the first surface 26a of the reflective layer 26. When the second surface 52b of the scattering layer 52 faces the first surface 26a of the reflective layer 26, a different layer may be provided between the second surface 52b of the scattering layer 52 and the first surface 26a of the reflective layer 26.

Fourth Embodiment

Hereinafter, a fourth embodiment of the invention will be described with reference to FIG. 8.

Basic configurations of a projector and a light source device according to the fourth embodiment are similar to those of the first embodiment, and the configuration of a wavelength conversion element is different from that of the first embodiment. Therefore, an overall description of the projector and the light source device is omitted, and only the wavelength conversion element will be described.

Figure 8:
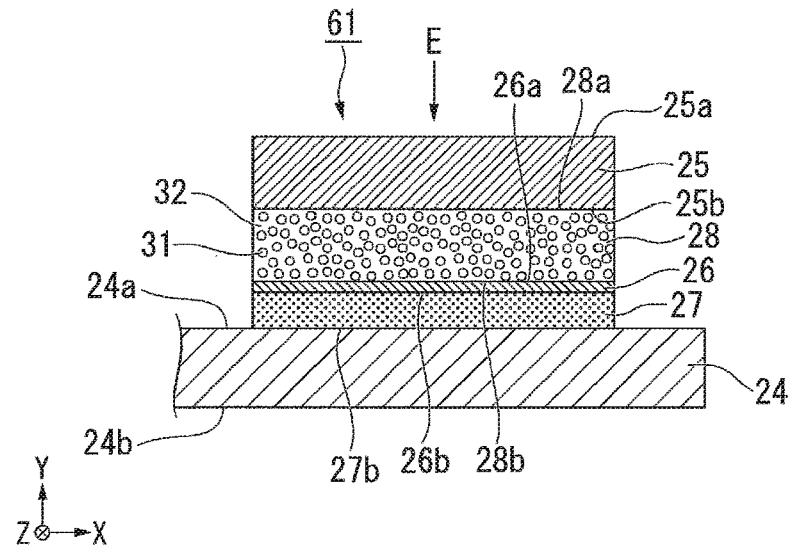
FIG. 8 is a cross-sectional view of a wavelength conversion element according to a fourth embodiment.

FIG. 8 is a cross-sectional view of the wavelength conversion element 61 according to the fourth embodiment.

In FIG. 8, components common to those in the drawings used in the first embodiment are denoted by the same reference numerals and signs, and a detailed description of the components is omitted.

As shown in FIG. 8, the wavelength conversion element includes the substrate 24, the bonding layer 27, the reflective layer 26, the scattering layer 28, and the phosphor layer 25 (wavelength conversion layer). The phosphor layer 25, the scattering layer 28, the reflective layer 26, and the bonding layer 27 are provided, in order from the side on which the excitation light E is incident, on the first surface 24a (upper surface) of the substrate 24.

The reflective layer 26 is provided between the scattering layer 28 and the bonding layer 27. That is, the reflective layer 26 is provided in contact with the scattering layer 28. The bonding layer 27 is provided between the reflective layer 26 and the first surface 24a of the substrate 24.

Other configurations of the wavelength conversion element 61 are similar to those of the first embodiment.

Also in the embodiment, it is possible to obtain an advantageous effect that it is possible to realize the wavelength conversion element 61 capable of reducing light loss at the reflective layer to increase the intensity of fluorescence, similarly to the first embodiment.

In the embodiment, the wavelength conversion element 61 can be manufactured by manufacturing a stacked body formed of the phosphor layer 25, the scattering layer 28, and the reflective layer 26, and then bonding the stacked body with the substrate 24 through the bonding layer 27. Moreover, the stacked body formed of the phosphor layer 25, the scattering layer 28, and the reflective layer 26 is bonded with the substrate 24 through the bonding layer 27; therefore, there is no need to use a light-transmissive material for the bonding layer 27, and thus a material excellent in heat resistance, heat dissipation property, and the like can be selected as a bonding material from more materials.

In the embodiment, the second surface 28b of the scattering layer 28 may abut or face the first surface 26a of the reflective layer 26. When the second surface 28b of the scattering layer 28 faces the first surface 26a of the reflective layer 26, a different layer may be provided between the second surface 28b of the scattering layer 28 and the first surface 26a of the reflective layer 26.

Similarly, the second surface 26b of the reflective layer 26 may abut or face the first surface 27a of the bonding layer 27. When the second surface 26b of the reflective layer 26 faces the first surface 27a of the bonding layer 27, a different layer may be provided between the second surface 26b of the reflective layer 26 and the first surface 27a of the bonding layer 27.

Similarly, the second surface 27b of the bonding layer 27 may abut or face the first surface 24a of the substrate 24. When the second surface 27b of the bonding layer 27 faces the first surface 24a of the substrate 24, a different layer may be provided between the second surface 27b of the bonding layer 27 and the first surface 24a of the substrate 24.

Fifth Embodiment

Hereinafter, a fifth embodiment of the invention will be described with reference to FIG. 9.

Basic configurations of a projector and a light source device according to the fifth embodiment are similar to those of the first embodiment, and the configuration of a wavelength conversion device differs from the configuration of the wavelength conversion device 20 according to the first embodiment. Therefore, an overall description of the projector and the light source device is omitted, and only the wavelength conversion device will be described.

Figure 9:
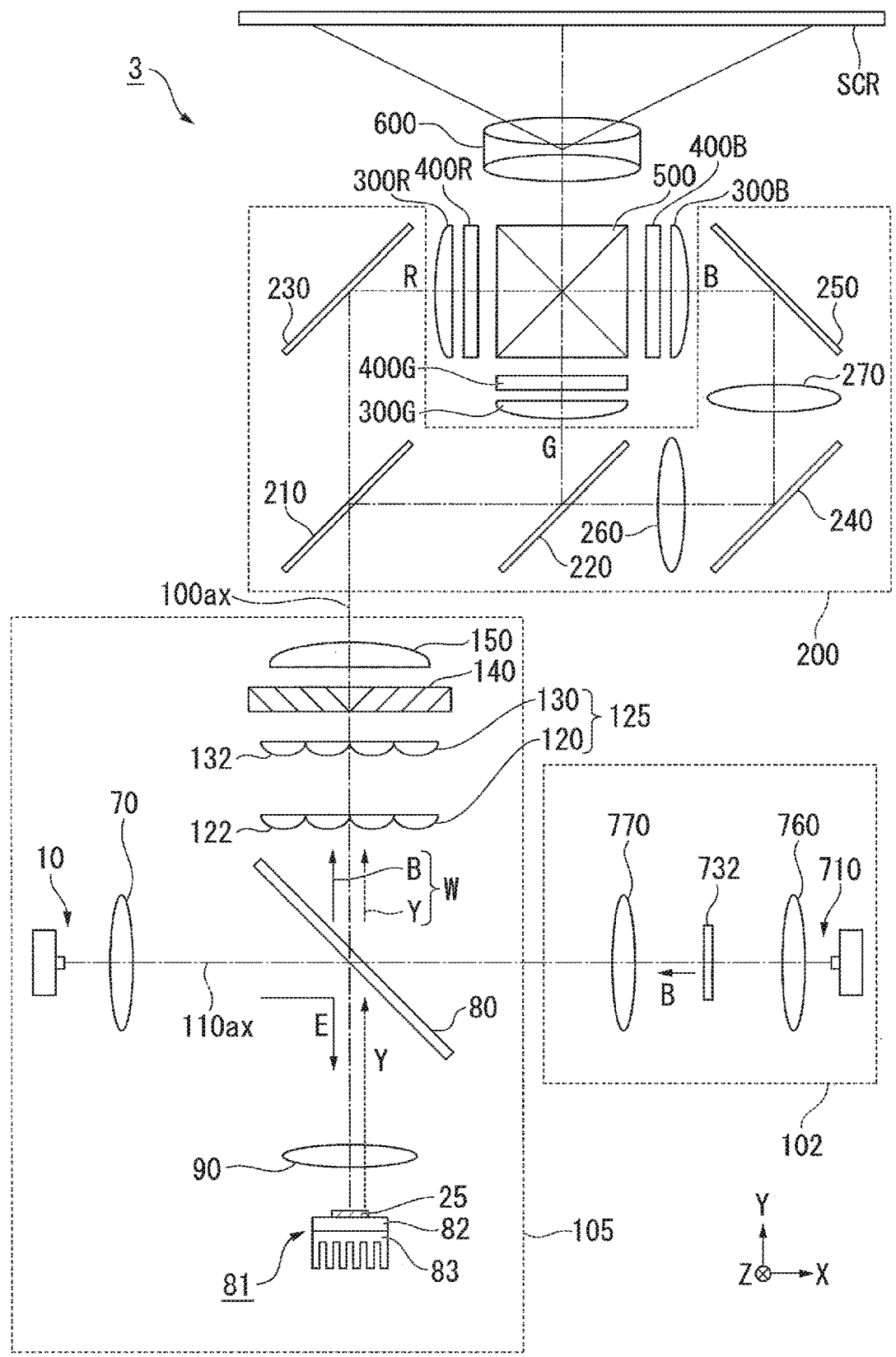
FIG. 9 is a schematic configuration diagram of a projector according to a fifth embodiment.

FIG. 9 is a schematic configuration diagram of the projector 3 according to the fifth embodiment.

In FIG. 9, components common to those in the drawings used in the first embodiment are denoted by the same reference numerals and signs, and a detailed description of the components is omitted.

The wavelength conversion device 20 of the first light source device 100 according to the first embodiment includes the wavelength conversion element 21 having a disk shape rotatable by the motor 22. In contrast, in the projector 3 according to the fifth embodiment, a first light source device 105 includes a fixed type wavelength conversion element 81 (wavelength conversion device 81) as shown in FIG. 9. The wavelength conversion element 81 has, for example, a rectangular shape as viewed in the normal direction of a substrate 82. A wavelength conversion element having a cross-sectional structure similar to that of each of the wavelength conversion elements 21, 41, 51, and 61 exemplified in the first to fourth embodiments can be used for the wavelength conversion element 81. However, a heat sink 83 may be provided on the substrate 82 for enhancing a heat dissipation action.

Also in the fifth embodiment, it is possible to obtain an advantageous effect that it is possible to realize the wavelength conversion element 81 capable of reducing light loss at the reflective layer to increase the intensity of fluorescence, similarly to the first embodiment.

The technical scope of the invention is not limited to the embodiments, but various modifications can be added within the range not departing from the gist of the invention.

For example, in the embodiments, the particle diameter of the particle is smaller than the lower limit (wavelength on the short wavelength side) of the wavelength range of fluorescence, and therefore, Rayleigh scattering occurs in the entire wavelength range of fluorescence. However, it is sufficient that the particle diameter of the particle is smaller than at least the upper limit (wavelength on the long wavelength side) of the wavelength range of fluorescence. In this case, Rayleigh scattering occurs in at least a portion of the wavelength range of fluorescence, and therefore, fluorescence with high intensity can be obtained compared to a wavelength conversion element in the related art.

Moreover, a layer other than the layers exemplified in the embodiments may be added to the wavelength conversion element according to the invention. For example, an anti-reflection layer may be provided on the excitation-light incident side of the first surface of the phosphor layer.

In addition, the number, shape, material, arrangement, and the like of components constituting each of the wavelength conversion element and the light source device can be appropriately changed. Moreover, although the projector including three light modulators has been exemplified in the embodiments, the invention can also be applied to a projector that displays a color video with one light modulator. Further, the light modulator is not limited to the liquid crystal panel described above, but, for example, a digital mirror device or the like can also be used.

In addition, the shape, number, arrangement, material, and the like of components constituting the projector are not limited to those of the embodiments, but can be appropriately changed.

Moreover, although an example in which the light source device according to the invention is mounted in the projector has been shown in the embodiments, the invention is not limited to this example. The light source device according to the invention can also be applied to a luminaire, a headlight of an automobile, and the like.

The entire disclosure of Japanese Patent Application No. 2017-173266, filed on Sep. 8, 2017 is expressly incorporated by reference herein.

What is claimed is:

1. A wavelength conversion element comprising:
    a wavelength conversion layer including a first surface on which excitation light is incident, and a second surface opposed to the first surface;
    a scattering layer provided to face the second surface, containing a plurality of particles, and at least scattering fluorescence obtained by wavelength-converting the excitation light by the wavelength conversion layer; and
    a reflective layer provided to face the scattering layer and reflecting the excitation light or the fluorescence, wherein
    the particle diameter of the particle is smaller than the wavelength of the fluorescence.

2. The wavelength conversion element according to claim 1, further comprising:
    a substrate including a first surface; and
    a bonding layer, wherein
    the reflective layer is provided to face the first surface of the substrate, and
    the bonding layer is provided between the scattering layer and the reflective layer.

3. The wavelength conversion element according to claim 1, further comprising:
    a substrate including a first surface; and
    a bonding layer, wherein
    the reflective layer is provided to face the scattering layer, and
    the bonding layer is provided between the reflective layer and the first surface of the substrate.

4. The wavelength conversion element according to claim 1, further comprising a substrate including a first surface, wherein
the reflective layer is provided to face the first surface of the substrate,
the scattering layer includes a holding material holding the plurality of particles, and
the wavelength conversion layer and the reflective layer are bonded together by the holding material.

5. The wavelength conversion element according to claim 1, wherein
the particle is made of titanium oxide or zinc oxide.

6. A light source device comprising:
the wavelength conversion element according to claim 1; and
an excitation light source emitting the excitation light.

7. A light source device comprising:
the wavelength conversion element according to claim 2; and
an excitation light source emitting the excitation light.

8. A light source device comprising:
the wavelength conversion element according to claim 3; and
an excitation light source emitting the excitation light.

9. A light source device comprising:
the wavelength conversion element according to claim 4; and
an excitation light source emitting the excitation light.

10. A light source device comprising:
the wavelength conversion element according to claim 5; and
an excitation light source emitting the excitation light.

11. A projector comprising:
the light source device according to claim 6;
a light modulator modulating light from the light source device according to image information to thereby form image light; and
a projection optical device projecting the image light.

12. A projector comprising:
the light source device according to claim 7;
a light modulator modulating light from the light source device according to image information to thereby form image light; and
a projection optical device projecting the image light.

13. A projector comprising:
the light source device according to claim 8;
a light modulator modulating light from the light source device according to image information to thereby form image light; and
a projection optical device projecting the image light.

14. A projector comprising:
the light source device according to claim 9;
a light modulator modulating light from the light source device according to image information to thereby form image light; and
a projection optical device projecting the image light.

15. A projector comprising:
the light source device according to claim 10;
a light modulator modulating light from the light source device according to image information to thereby form image light; and
a projection optical device projecting the image light.

* * * * *